(12) United States Patent
Krishnan

(10) Patent No.: US 8,102,815 B2
(45) Date of Patent: Jan. 24, 2012

(54) PROXY MOBILITY OPTIMIZATION

(75) Inventor: Suresh Krishnan, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 679 days.

(21) Appl. No.: 11/776,822

(22) Filed: Jul. 12, 2007

(65) Prior Publication Data

US 2009/0016364 A1   Jan. 15, 2009

(51) Int. Cl.
*H04W 4/00* (2009.01)
(52) U.S. Cl. .................... 370/331; 370/329; 455/436
(58) Field of Classification Search .................. 709/245, 709/203; 370/331, 390, 328, 310, 338; 455/90.2, 455/405, 406
See application file for complete search history.

(56) References Cited

U.S. PATENT DOCUMENTS

| | | | |
|---|---|---|---|
| 6,795,857 B1 | 9/2004 | Leung et al. | |
| 6,982,967 B1 | 1/2006 | Leung | |
| 7,079,499 B1* | 7/2006 | Akhtar et al. | 370/310 |
| 7,539,164 B2* | 5/2009 | Maenpaa et al. | 370/331 |
| 7,953,044 B2* | 5/2011 | Xia et al. | 370/331 |
| 2003/0161287 A1* | 8/2003 | Venkitaraman et al. | 370/338 |
| 2004/0013099 A1 | 1/2004 | O'Neill | |
| 2004/0013116 A1 | 1/2004 | Greis et al. | |
| 2004/0114559 A1 | 6/2004 | Wang | |
| 2004/0213260 A1 | 10/2004 | Leung et al. | |
| 2007/0005971 A1* | 1/2007 | Leung et al. | 713/171 |
| 2007/0268919 A1* | 11/2007 | Sarikaya et al. | 370/401 |
| 2008/0176560 A1* | 7/2008 | Dutta et al. | 455/433 |
| 2008/0256220 A1* | 10/2008 | Bachmann et al. | 709/222 |
| 2008/0285518 A1* | 11/2008 | Dutta et al. | 370/331 |
| 2009/0003297 A1* | 1/2009 | Xia et al. | 370/338 |
| 2009/0073935 A1* | 3/2009 | Xia et al. | 370/331 |
| 2009/0080387 A1* | 3/2009 | Dell'Uomo et al. | 370/338 |
| 2009/0080441 A1* | 3/2009 | Krishnan et al. | 370/400 |
| 2010/0067446 A1* | 3/2010 | Oulai et al. | 370/329 |
| 2010/0226256 A1* | 9/2010 | Kato et al. | 370/241 |
| 2010/0226313 A1* | 9/2010 | Sugimoto et al. | 370/328 |

FOREIGN PATENT DOCUMENTS

| | | |
|---|---|---|
| EP | 1 111 872 A2 | 6/2001 |
| EP | 1 111 872 A3 | 7/2003 |

OTHER PUBLICATIONS

Gundavelli et al.: title, "Proxy Mobile IPv6", Internet Draft, Mar. 5, 2007, 52 pages, expires on Sep. 6, 2007.
Qin, A. et al.: "PMIPv6 Route Optimization Protocol; draft-qin-mipshop-pmipro-00.txt"; IETF Standard-Working-Draft, Internet Engineering Task Force, IETF, CH, Feb. 25, 2007, XP015050321. (24 pages).
Gundavelli, S. et al.: "Proxy Mobile IPv6", draft-sgundave-mip6-proxymip6-01.txt, IETF Standard-Working-Draft, Internet Engineering Task Force, IETF, CH, No. 1, Jan. 5, 2007, XP015050402. (39 pages).
International Search Report for PCT patent application No. PCT/IB2008/052605 dated Mar. 17, 2009. (7 pages).

* cited by examiner

*Primary Examiner* — Michael J Moore, Jr.
(74) *Attorney, Agent, or Firm* — Ericsson Canada Inc.; Alex Nicolaescu

(57) ABSTRACT

Systems and methods are described which provide communication between a correspondent node and a mobile node including receiving a home prefix of the mobile node and a list of correspondent nodes by a mobile access gateway having an access link with the mobile node and submitting proxy binding update messages by the mobile access gateway to a home agent corresponding to the mobile node and to each of the correspondent nodes in the list.

26 Claims, 9 Drawing Sheets

PROXY MOBILITY OPTIMIZATION

TECHNICAL FIELD

The present invention relates generally to telecommunications systems and in particular to methods and systems for reducing latency in communication between devices over a network.

BACKGROUND

As the consumer electronics industry continues to mature, and the capabilities of processors increase, more devices have become available for public use that allow the transfer of data between devices and more applications have become available that operate based on their transferred data. Of particular note are the Internet and local area networks (LANs). These two innovations allow multiple users and multiple devices to communicate and exchange data between different devices and device types. With the advent of these devices and capabilities, users (both business and residential) increasingly desire to transmit data from mobile locations.

The first widespread deployment of a protocol to deal with these issues, was Internet Protocol version 4 (IPv4) in the early 1980's. IPv4 is a network layer protocol used to provide unique addressing to ensure that two computers communicating over the Internet can uniquely identify each other. IPv4 has a 32-bit addressing scheme which allows for $2^{32}$ (approximately 4.2 billion) potentially unique addresses. This limit of $2^{32}$ addresses is becoming a bottleneck as the need for more unique addresses will arrive in the foreseeable future. Additionally, IPv4 was not specifically designed to be efficient for mobile users. In fact, when IPv4 was implemented there were not a lot of mobile consumer devices that could communicate across the Internet as there are today. In this context, mobile IP equipment can be considered to be any a piece of equipment that is moveable, e.g., a laptop computer, cell phone or a Personal Digital Assistant (PDA), and that crosses boundaries between different networks while desiring to maintain connectivity or be allowed to connect to a foreign network. Accordingly, as this need and the need for more IP addresses developed, Internet Protocol version 6 (IPv6) was created and is now being implemented.

IPv6 uses a 128-bit addressing scheme which allows for $2^{128}$ unique addresses, i.e., significantly more addresses than are provided for in IPv4. The addressing scheme in IPv6 is composed of two parts: a 64-bit host part and a 64-bit sub network prefix (subnet prefix). IPv6 is also more mobile friendly than IPv4, particularly with the addition of Mobile IPv6 (MIPv6).

Mobile IP version 4 (Mobile IPv4, Mobile IP, MIPv4 or MIP) and the current version of Mobile IPv6 (MIPv6) are built to provide mobility to a host or Mobile Node (MN). The other nodes, usually referred to as Correspondent Nodes (CN), are usually seen as fixed hosts although they can also be mobile. Reference is now made to FIG. 1, which shows a MIPv6 network architecture 100 as suggested by the current MIPv6 specification found in an Internet Engineering Task Force (IETF)'s Request For Comment (RFC) number 3775. As can be seen in FIG. 1, an IP network 100 comprises a MN 110 in communication with a CN 150.

The MN 110 has a permanently assigned, 128-bit home address valid in its home network 115, which home address is allocated upon initialization of the MN 110 in the home network 115. The home address comprises a subnet prefix, which is 64-bit long, and an interface identifier, which is also 64-bit long. The allocation mechanism is well-known in the prior art. The MN 110 is further in communication with a Home Agent (HA) 140 located in its home network 115 (via 125). Among other functionalities, the HA 140 keeps record of a foreign address of the MN 110 valid outside the home network 115. The foreign address is called Care-of-Address (CoA) in the context of MIPv6, and also comprises 128 bits. The CoA assigned to the MN 110 changes in time as the MN 110 moves from one network to another. The record kept by the HA 140, referred to as binding in the context of MIPv6, ties the CoA to the home address. A Binding Cache Entry (BCE) comprising the home address and the CoA of the mobile node is also kept in the CN 150 for the purpose of reaching the MN 110. The HA 140 is also responsible for routing traffic received at the home address to the MN 110. The traffic received is forwarded by the HA 140 on a link 145 toward the MN 110.

The MIPv6 concept in a typical situation is described below. The MN 110 is in bidirectional IP session (via 155), with the CN 150. When the MN 110 moves from a first home network to a visited network, as illustrated by arrow 135 in FIG. 1, the MN 110 acquires a first CoA. This modification in addressing state of the MN 110 must be advertised to the CN 150. In order to advertise the acquisition of its first CoA, the MN 110 sends a first binding update (BU), comprising the HoA, the first CoA and a 64-bit sequence number (SQN), to the CN 150. The CN 150, upon reception of the first BU creates a BCE for the session, where it stores the HoA, the first CoA and the SQN. The CN 150 then sends a first binding acknowledgement (BA) to the MN 110. Reception of the first BA at the MN 110 indicates a successful completion of the advertisement of the modification of the addressing state.

MIPv6, therefore, provides a stable identifier (a Home Address) to a mobile node (MN) while it is moving between multiple IP networks. This is established by mapping the home address (HoA) into a Care-of-address (CoA) that is the current topological address of the mobile node. This mapping is performed either by the Home Agent (HA) in the bidirectional tunneling mode or by the node which is talking to the mobile node, the correspondent node (CN), in the Route Optimized (RO) mode.

Moreover, in MIPv6, the MN is responsible for signaling to its home agent to enable session continuity as the MN moves between networks. The mobile node controls the mobility management. This signaling utilizes scarce radio resources (such as the link between the MN and a network for example). Furthermore, not all nodes may be capable of supporting MIPv6.

According to one method described in the IETF PMIPv6 draft entitled Proxy Mobile IPv6, another network node can be used as a proxy mobile agent for the mobile node in order to allow nodes incapable of (or, unwilling to perform) MIPv6 to enjoy the benefits of mobility. The proxy mobile agent can perform the mobility signaling on behalf of the mobile node. Another advantage of using a proxy agent in a radio access network is that the MIPv6 signaling does not use the scarce radio resources (over the link between the MN and a network for example). The proxy mobility agent (PMA) is a functionality that can be implemented within an access router (AR) through which the MN communicates to the network.

The above described solution, however, does not facilitate an optimal path for transmitting data packets between a mobile node and correspondent nodes. The proxy mobile agent can be used to reduce latency in communication of data packets between a mobile node and correspondent nodes. Accordingly, exemplary embodiments described below address the need for reducing the latency in communicating data packets between a mobile node and Correspondent nodes over a network.

SUMMARY

According to one exemplary embodiment of the invention, a method which provides communication between a correspondent node and a mobile node includes receiving a home prefix of the mobile node and a list of correspondent nodes by a mobile access gateway having an access link with the mobile node and submitting proxy binding update messages by the mobile access gateway to a home agent corresponding to the mobile node and to each of the correspondent nodes in the list.

According to another exemplary embodiment of the invention, a network node for providing a data link between a correspondent node and a mobile node includes a processor in communication with a memory unit wherein the processor receives a home prefix of the mobile node and a list of correspondent nodes having current sessions with the mobile node and submits proxy binding update messages to a home agent corresponding to the mobile node and to each of the correspondent nodes in the list wherein the mobile node has an access link to the network node.

According to yet another exemplary embodiment of the invention, a mobile node includes a processor in communications with a memory unit, wherein the processor transmits identification of the mobile node and identification of a plurality of correspondent nodes currently having sessions with the mobile node to an authenticating server to make available a home network prefix of the mobile node and the identity of the plurality of correspondent nodes to a mobile access gateway having an access link with the mobile node.

According to a further exemplary embodiment of the invention, a correspondent node includes a processor in communications with a memory unit, wherein the processor, upon receiving a proxy binding update from a mobile access gateway, submits a proxy binding acknowledgement to the mobile access gateway, wherein the mobile access gateway has an access link to a mobile node.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
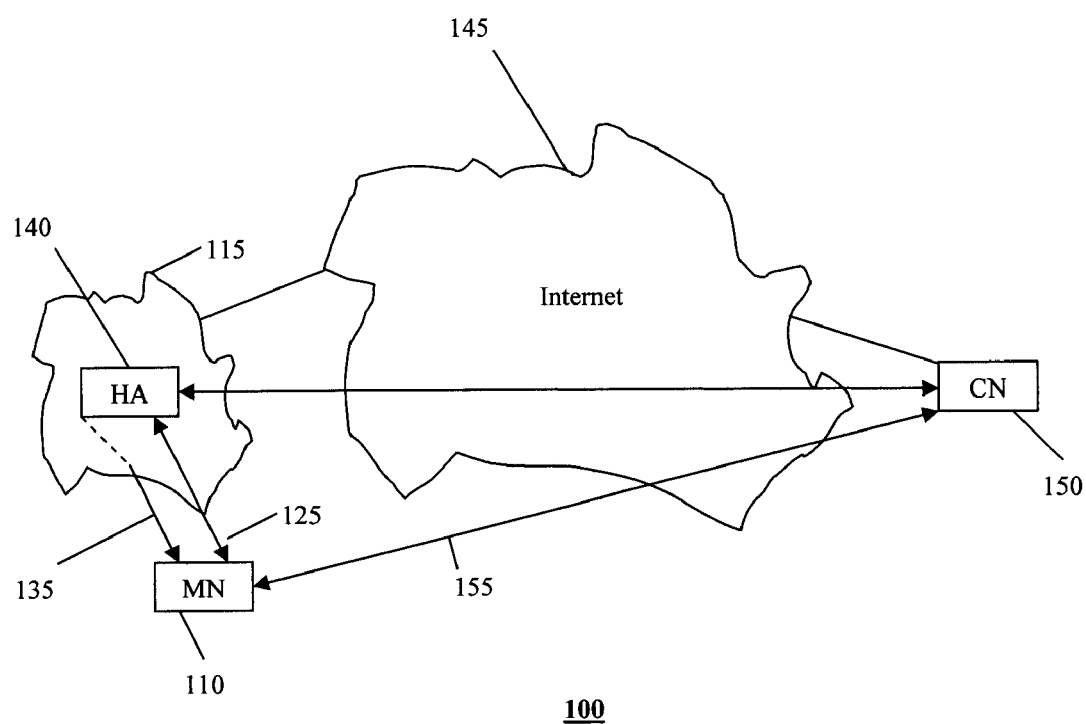
FIG. 1 depicts a mobile node (MN) communicating with a correspondent node (CN) through a home agent (HA)
Figure 2:
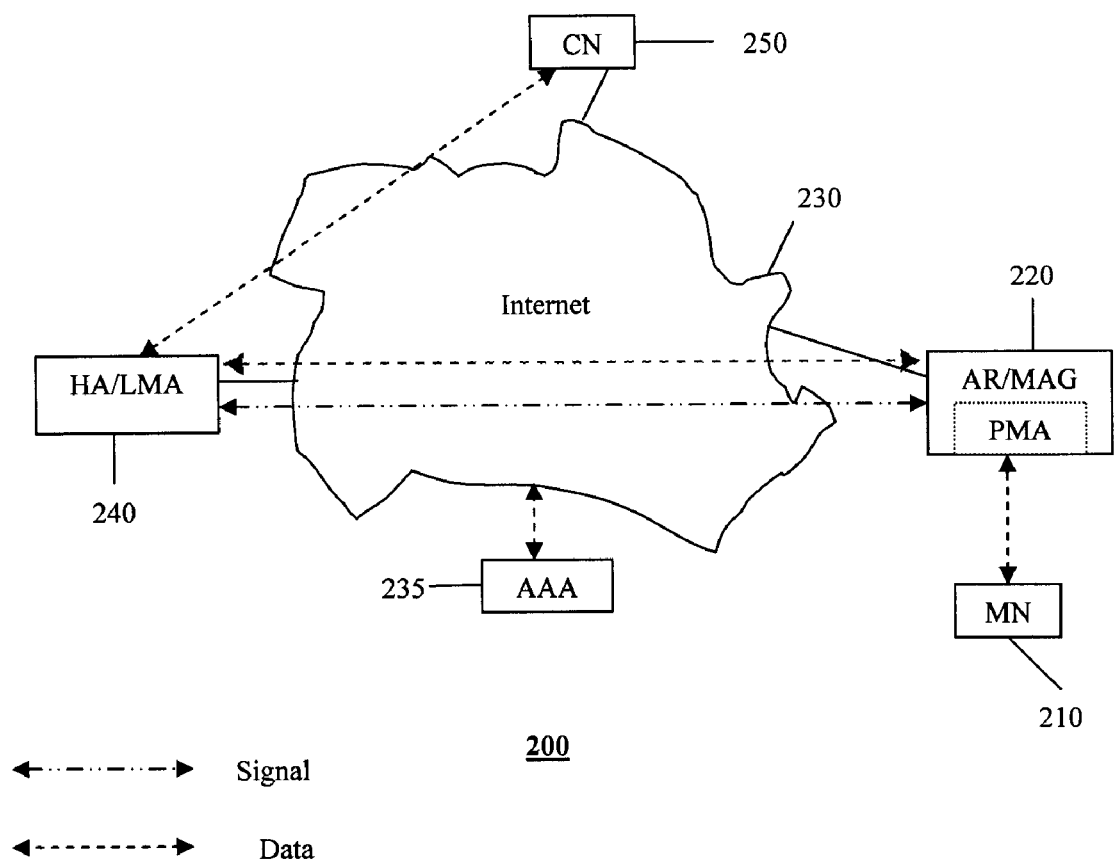
FIG. 2 depicts a mobile node (MN) communicating with a correspondent node (CN) in a Proxy Mobile IPv6 network.

In order to provide some context for this discussion, a brief discussion of exemplary components used by a mobile node (MN) for communications in a network utilizing a proxy mobile agent (PMA) will now be described according to FIGS. 2, 3A and 3B. FIG. 2 depicts a communication setup for a MN 210.

As described in the draft document entitled *Proxy Mobile IPv6*, certain elements in a Mobile IPv6 network may be functionally somewhat analogous and may also be alternately referred to as the following terms in the Proxy Mobile IPv6 domain. An Access Router (AR) may be referred to as the Mobile Access Gateway (MAG). MAG includes the functionality of the proxy mobility agent (PMA) which manages the mobility related signaling for a MN that is attached to the MAG's access link. MAG is responsible for tracking the MN's attachment to the link. The Home Agent (HA) for a MN may be referred to as the Local Mobility Anchor (LMA). LMA manages the MN's reachability state.

Every mobile node that roams in a Proxy Mobile IPv6 domain may be identified by an identifier such as a MN-Identifier. This identifier may be used to obtain the MN's policy profile from a policy store such as an AAA (Authentication Authorization Accounting) server. The policy profile may include MN's home prefix, permitted address configuration modes, roaming policy and other parameters that are essential for providing network based mobility service.

Figure 3A:
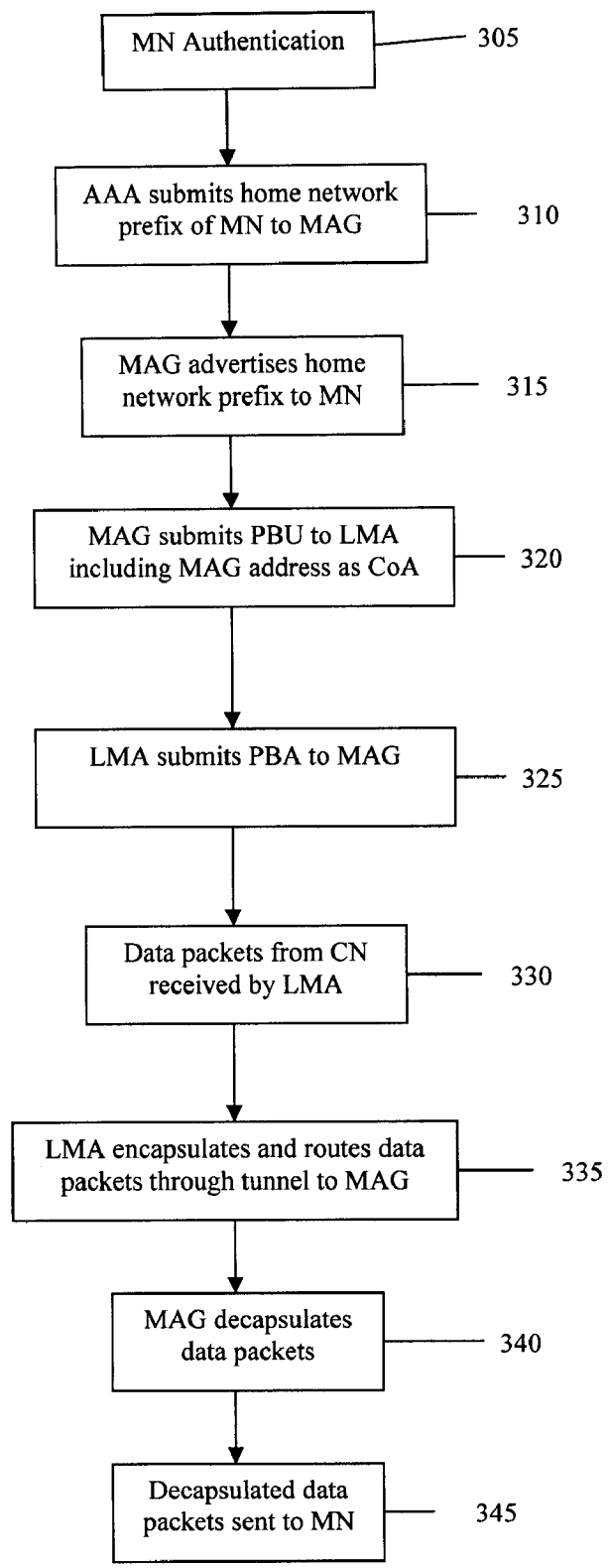
FIGS. 3A and 3B illustrate a process for communication data packets between a correspondent node and a mobile node in a Proxy Mobile IPv6 network.

Upon entry into its Proxy Mobile IPv6 domain, mobile node 210 performs access authentication using its identity such as its Network Access Identifier, NAI (Step 305 of FIG. 3A). In authenticating MN 210, AAA server 235 submits information regarding the home network prefix of MN 210 to Access Router (AR) or MAG 220 (Step 310). MN 210 is in communication with at least one correspondent node (CN) 250.

MAG 220 advertises the home prefix on the link to MN 210 through periodic router advertisements for example (Step 315). The home address could also be obtained via Dynamic Host Configuration Protocol (DHCP). MN 210 operates as if it is on its own network. In order to update LMA 240 about the current location of MN 210, MAG 220 submits a proxy binding update (PBU) message to LMA 240 which includes the identify of MN 210 and the MAG address as the Care of Address (CoA) for MN 210 (Step 320). Upon accepting PBU from MAG 220, LMA 240 submits a proxy binding acknowledgment (PBA) to MAG 220 (Step 325). Upon receipt of the PBA by MAG 220, a tunnel may be set up between MAG 220 and LMA 240.

Data packets from CN 250 intended for MN 210 are received at LMA 240 (Step 330). LMA 240 encapsulates the received data packets and routes them through the tunnel to the Care of Address, CoA, corresponding to MAG 220 (Step 335). MAG 220 receives the encapsulated packets and decapsulates them (Step 340). The decapsulated packets are then sent by MAG 220 on the access link to MN 210 (Step 345).

Figure 3B:
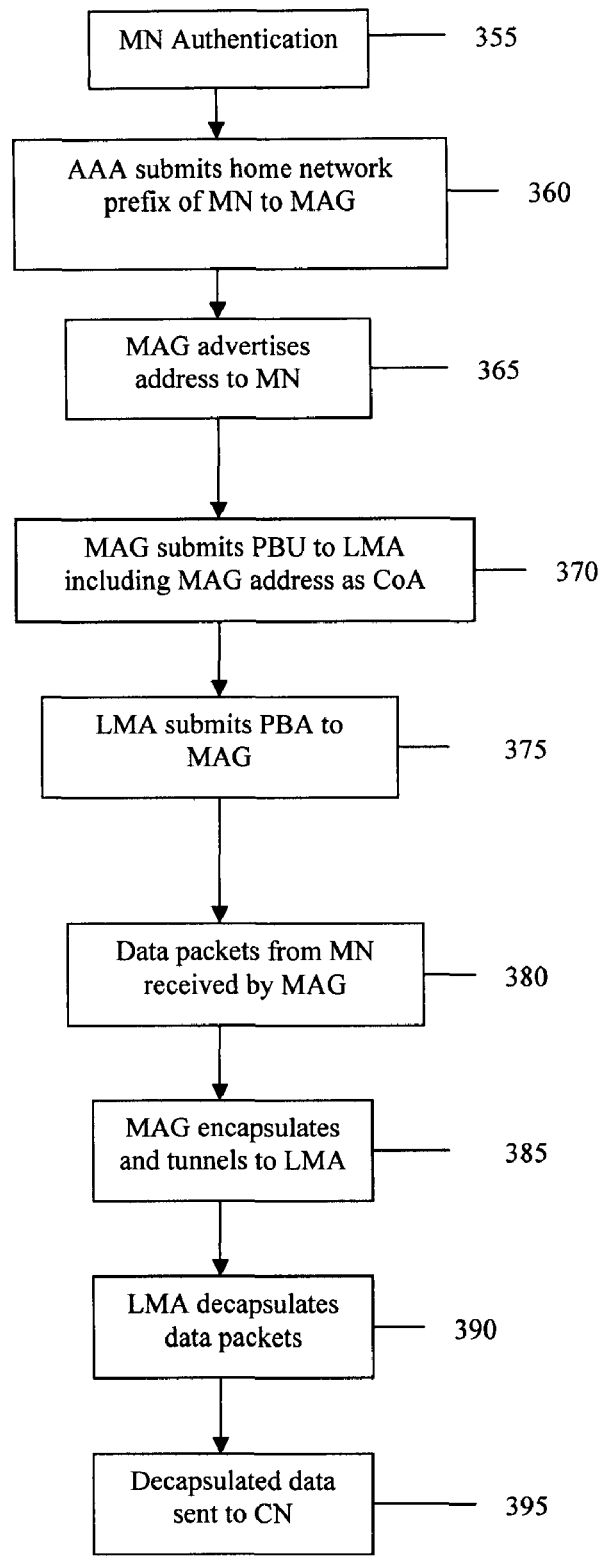

Data packets from mobile node 210 traverse the path described above in reverse before reaching correspondent node 250 as illustrated in FIGS. 2 and 3B. MN 210 is authenticated (step 355 of FIG. 3B). The home network prefix of MN 210 is submitted by AAA server 235 to MAG 220 (step 360). The home network prefix is advertised by AAA server 235 (step 365). A PBU is submitted by MAG 220 to LMA 240 which includes the MAG address as the CoA for MN 210 (step 370). A PBA is submitted by LMA 240 to MAG 220 and a tunnel is set between MAG 220 and LMA 240 (Step 375). Data packets from MN 210 are received by MAG 220 (step 380). The data packets are encapsulated by MAG 220 (step 385) and routed through the tunnel to LMA 240. LMA 240 decapsulates the data packets (step 390) and forwards them to the intended correspondent node (step 395).

The process as described above results in a latency in communication between correspondent node 250 and mobile node 210 since the data packets go through the home agent.

A proxy optimization method in accordance with exemplary embodiments reduces the latency in the data communication. An exemplary proxy optimization method may be described with reference to FIGS. 4, 5A and 5B.

Figure 5A:
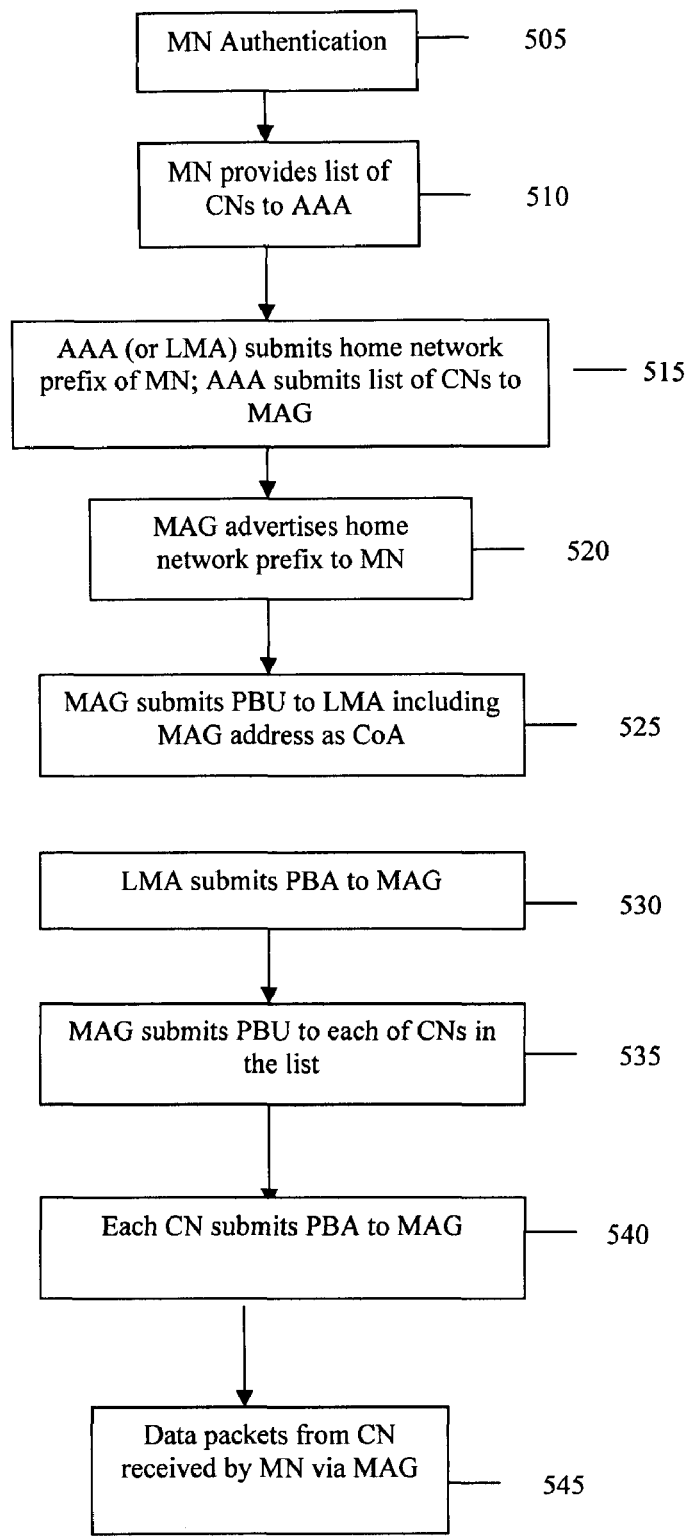
FIGS. 5A and 5B illustrate the a process for communication of data packets between a correspondent node and a mobile node in a Proxy Mobile IPv6 network according to exemplary embodiments.

A mobile node 410 performs access authentication using its identity (using its network access identifier or NAI for example) (Step 505 of FIG. 5A). In contrast to existing methods described above, mobile node 410 also provides a list of correspondent nodes (CNs) 450 that it (i.e. the mobile node) has sessions with currently (Step 510).

AAA server 435 submits information regarding the home network prefix of the MN 410 to MAG 420 (Step 515). In some embodiments, the home network prefix may be obtained from the LMA. AAA server 435 also submits the list of CNs received from MN 410 to MAG 420. MAG 420 advertises the home network prefix on the link to MN 410 (Step 520). MN 410 operates as if it is in its own network. MAG 420 submits a proxy binding update (PBU) message to LMA 440 which includes the MAG address as the Care of Address (CoA) for MN 410 (Step 525). LMA 440 submits a proxy binding acknowledgement (PBA) to MAG 420 (Step 530). In contrast to existing methods, MAG 420 also sends PBU messages to each of the CNs in the list provided by MN 410 (Step 535). Each CN on the list submits a PBA to MAG 420 (Step 540). Each CN on the list (e.g. CN 450) maintains a binding record (in binding cache) binding the home address of the mobile node (e.g. MN 410) and the MAG address having a link with the mobile node (i.e. the CoA of the MN).

Traffic (in the form of data packets) from CNs 450 is sent to MN 410 via MAG 420 (Step 545) bypassing LMA 440.

Figure 4:
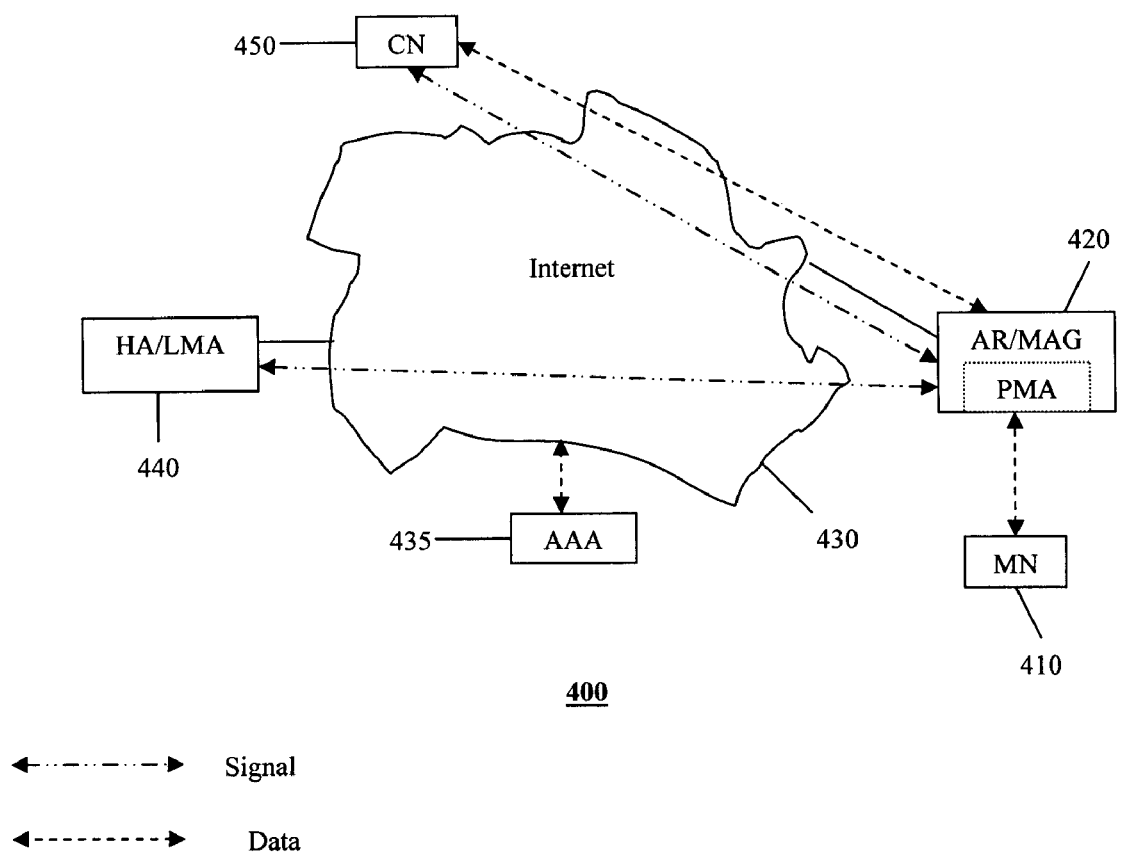
FIG. 4 depicts a mobile node (MN) communicating with a correspondent node (CN) in a Proxy Mobile IPv6 network according to exemplary embodiments.
Figure 5B:
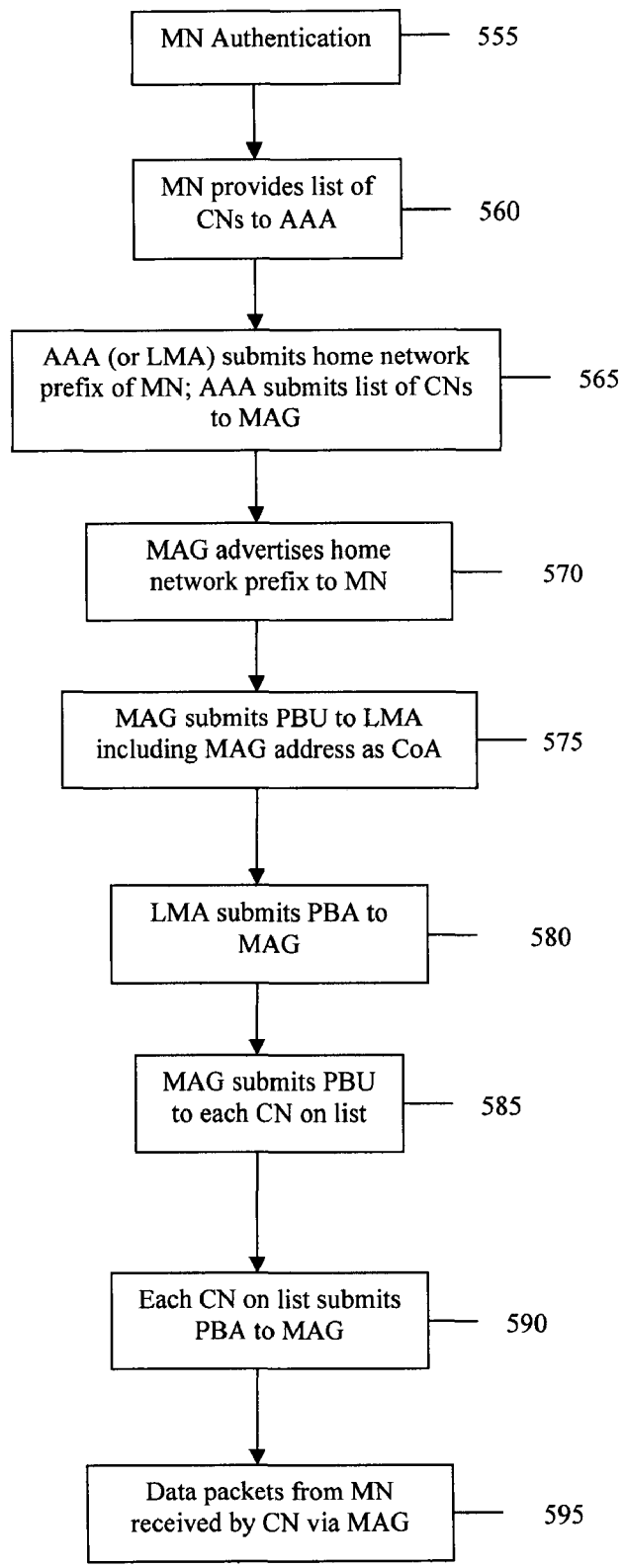

Data packets from mobile node 410 traverse the path described above in reverse before reaching CNs 450 as illustrated in FIGS. 4 and 5B.

As described above, mobile node 410 performs access authentication using its identity (using its network access identifier or NAI for example) (Step 555 of FIG. 5B). In contrast to existing methods described above, mobile node 410 also provides a list of correspondent nodes (CNs) 450 that it (i.e. the mobile node) has sessions with currently (Step 560).

AAA server 435 submits information regarding the home network prefix of the MN 410 to MAG 420 (Step 565). The home network prefix may be obtained from the LMA. AAA server 435 also submits the list of CNs received from MN 410 to MAG 420. MAG 420 advertises the home network prefix on the link to MN 410 (Step 570). MN 410 operates as if it is in its own network. MAG 420 submits a proxy binding update (PBU) message to LMA 440 which includes the MAG address as the Care of Address (CoA) for MN 410 (Step 575). LMA 440 submits a proxy binding acknowledgement (PBA) to MAG 420 (Step 580). In contrast to existing methods, MAG 420 also sends PBU messages to each of the CNs in the list provided by MN 410 (Step 585). Each CN on the list submits a PBA to MAG 420 (Step 590). Each CN on the list (e.g. CN 450) maintains a binding record (in binding cache) binding the home address of the mobile node (e.g. MN 410) and the MAG address having a link with the mobile node (i.e. the CoA of the MN).

Traffic (in the form of data packets) from MN 410 is sent to CN 450 via MAG 420 (Step 545) bypassing LMA 440.

The exemplary embodiments described above provide for communication of data packets involving access routers, mobile nodes, correspondent nodes and other network nodes. An exemplary network node 600 will now be described with respect to FIG. 6. Network node 600 can contain a processor 602 (or multiple processor cores), memory 604, one or more secondary storage devices 606 and an interface unit 608 to facilitate communications between network node 600 and the rest of the network. The memory can be used for storage of exemplary items described above such as the home network prefix of a mobile node, identity of the list of correspondent nodes currently having sessions with the mobile node, home address of the mobile node or any other relevant information. Thus, a network node according to exemplary embodiments may include a processor for transmitting and receiving messages associated with binding update and acknowledgement information related to a mobile network including the mobile node and/or a correspondent node.

Figure 6:
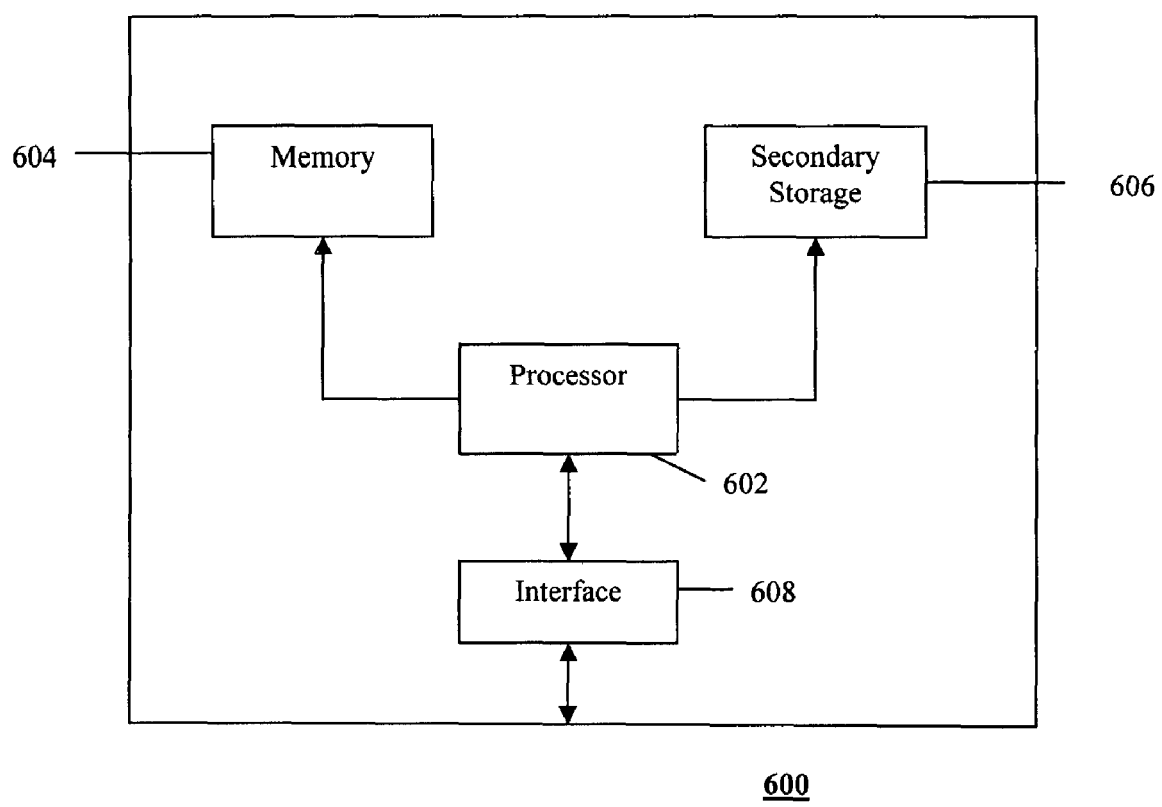
FIG. 6 depicts a network node according to exemplary embodiments.

An exemplary mobile node may be similar to the network node illustrated in FIG. 6 in that the mobile node can contain a processor (or multiple processor cores), memory, one or more secondary storage devices and an interface unit for facilitating communications with the network node. The memory can store exemplary items such as the mobile node's network access identifier (NAI), a contact list, identity of the correspondent nodes that are currently in session with the mobile node or other relevant information. The contact list can include names and associated contact and/or personal information. A mobile node may also include a display, an interface for facilitating user input (such as a numerical/alphabetic/alphanumeric keypad, a stylus interface, touch sensitive surface, etc.), an antenna (internal or external). A mobile node may further include functionality for capturing images (i.e. a digital camera). A mobile node according to exemplary embodiments may include a processor for providing a link with a network node (such as a mobile access gateway) and for transmitting and receiving data packets to/from a mobile access gateway of the network.

Figure 7:
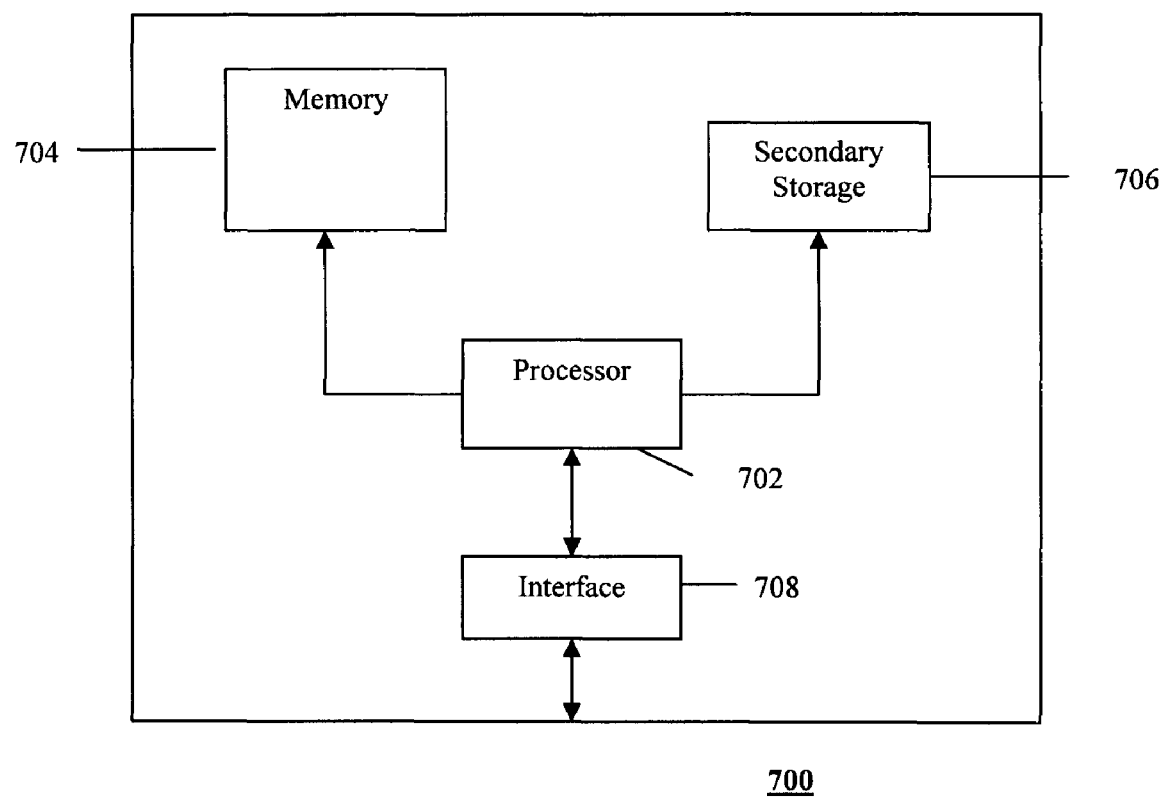
FIG. 7 depicts a mobile node according to exemplary embodiments.

An exemplary correspondent node 700 will now be described with respect to FIG. 7. Correspondent node 700 can contain a processor 702 (or multiple processor cores), memory 704, one or more secondary storage devices 706 and an interface unit 708 to facilitate communications between correspondent node 700 and the rest of the network. The memory can be used for storage of exemplary items described above such as home network prefix of a mobile node having a current session with the correspondent node, an address of a mobile access gateway having a link with the mobile node, a home address and a care-of addresses of the mobile node or any other relevant information. The address information may be stored in a binding cache (e.g., in one or more binding records). Thus, a correspondent node according to an exemplary embodiment may include a processor for transmitting and receiving messages associated with binding update and acknowledgement information related to a mobile network including the network node.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for communicating data between a correspondent node and a mobile node, the method comprising:
   receiving a home network prefix of the mobile node and a list of correspondent nodes by a mobile access gateway having an access link with the mobile node; and
   submitting proxy binding update messages by the mobile access gateway to a home agent corresponding to the mobile node and to each of the correspondent nodes in the list, thereby creating a traffic path, between one of the correspondent nodes of the list and the mobile node, which goes through the mobile access gateway but bypasses the home agent.

2. The method of claim 1, wherein the list includes correspondent nodes having current sessions with the mobile node.

3. The method of claim 1, wherein an authenticating server receives a mobile node identifier and the list of correspondent nodes from the mobile node.

4. The method of claim 3, wherein the authenticating server submits a home prefix of the mobile node to the mobile access gateway.

5. The method of claim 1, wherein the home network prefix is received from a local mobility anchor.

6. The method of claim 1, wherein the proxy binding update message includes the mobile access gateway address as the care of address for the mobile node.

7. The method of claim 6, wherein the home agent and each of the correspondent nodes on the list submit a proxy binding acknowledgement to the mobile access gateway.

8. The method of claim 7, wherein data packets from one of the correspondent nodes are submitted to the mobile node via the mobile access gateway bypassing the home agent.

9. The method of claim 1, wherein the mobile access gateway performs mobility related signaling on behalf of the mobile node attached to the mobile access gateway on an access link.

10. The method of claim 9, wherein the signaling is performed by a proxy mobile agent functionality included in the mobile access gateway.

11. The method of claim 1, wherein the mobile access gateway is an access router.

12. A network node for providing a data link between a correspondent node and a mobile node, the network node comprising:
    a processor in communication with a memory unit;
    wherein the processor receives a home prefix of the mobile node and a list of correspondent nodes having current sessions with the mobile node; and
    submits proxy binding update messages to a home agent corresponding to the mobile node and to each of the correspondent nodes in the list wherein the mobile node has an access link to the network node, thereby creating a data traffic path, between one of the correspondent nodes of the list and the mobile node, which goes through the mobile access gateway but bypasses the home agent.

13. The network node of claim 12, wherein the processor further receives proxy binding acknowledgements from the home agent and each of the correspondent nodes.

14. The network node of claim 13, wherein the processor further receives data packets from at least one correspondent node in the list and forwards the data packets to the mobile node.

15. The network node of claim 13, wherein the processor further receives data packets from the mobile node and forwards the data packets to at least one correspondent node in the list.

16. The network node of claim 12, wherein the processor performs mobility related signaling on behalf of the mobile node.

17. The network node of claim 12, wherein the home network prefix of the mobile node is received from an Authentication Authorization Accounting (AAA) server.

18. The network node of claim 12, wherein the home network prefix of the mobile node is received from a local mobility anchor (LMA).

19. A mobile node comprising:
    a processor in communications with a memory unit;
    wherein the processor transmits identification of the mobile node and identification of a plurality of correspondent nodes currently having sessions with the mobile node to make available a home network prefix of the mobile node and the identity of the plurality of correspondent nodes to a mobile access gateway having an access link with the mobile node, thereby creating a data traffic path, between one of the plurality of correspondent nodes and the mobile node, which goes through the mobile access gateway but bypasses a home agent corresponding to the mobile node.

20. The mobile node of claim 19, wherein the home network prefix is provided by a local mobility anchor to the mobile access gateway.

21. The mobile node of claim 19, wherein the processor transmits identification of the mobile node and identification of the plurality of correspondent nodes to an authenticating server.

22. The mobile node of claim 21, wherein the authenticating server provides the home network prefix of the mobile node and the identity of the plurality of correspondent nodes to the mobile access gateway.

23. The mobile node of claim 19, wherein the processor further transmits data packets to the mobile access gateway for submission to at least one of the correspondent nodes.

24. A correspondent node comprising:
    a processor in communications with a memory unit;
    wherein the processor, upon receiving a proxy binding update from a mobile access gateway, submits a proxy binding acknowledgement to the mobile access gateway, wherein the mobile access gateway has an access link to a mobile node, thereby creating a data traffic path, between the correspondent node and the mobile node, which goes through the mobile access gateway but bypasses a home agent corresponding to the mobile node.

25. The correspondent node of claim 24, further comprising a binding cache wherein the cache includes a binding record between a home address of the mobile node and an address of the mobile access gateway.

26. The correspondent node of claim 25, wherein the processor further transmits data packets to the mobile access gateway using the address of the mobile access gateway from the binding cache for submission to the mobile node.

* * * * *